United States Patent [19]

Buerger et al.

[11] Patent Number: 5,652,041
[45] Date of Patent: Jul. 29, 1997

[54] NONWOVEN COMPOSITE MATERIAL AND METHOD FOR MAKING SAME

[76] Inventors: Gernot K. Buerger, 5 Pinewood La., Groveland, Mass. 01834; Ralph Krueger, 3908 Springstop La.; Rocky Noell, 3802 Pickren Cir., both of Durham, N.C. 27705; Wolfgang Pfeiffer, 10012 Good View Ct., Raleigh, N.C. 27613

[21] Appl. No.: 571,026

[22] Filed: Dec. 12, 1995

Related U.S. Application Data

[63] Continuation of Ser. No. 115,377, Sep. 1, 1993, abandoned

[51] Int. Cl.$^6$ ........................................ B32B 27/14
[52] U.S. Cl. ........................ 428/198; 156/219; 156/220; 156/290; 156/308.2; 428/171; 428/172; 442/382; 442/415
[58] Field of Search .................. 428/171, 172, 428/198, 284, 286, 296, 297, 298; 156/219, 220, 290, 308.2

[56] References Cited

U.S. PATENT DOCUMENTS

| | | |
|---|---|---|
| 3,770,562 | 11/1973 | Newman .................. 428/287 |
| 4,039,711 | 8/1977 | Newman .................. 428/286 |
| 4,041,203 | 8/1977 | Brock et al. ............. 428/286 |
| 4,287,251 | 9/1981 | King et al. ............... 428/198 |
| 4,560,385 | 12/1985 | Baravian .................. 8/115.7 |
| 4,656,082 | 4/1987 | Goodacre et al. ....... 428/248 |
| 4,850,990 | 7/1989 | Huntoon et al. ........ 604/385 |
| 4,886,697 | 12/1989 | Perdelwitz, Jr. et al. ... 428/192 |
| 4,906,507 | 3/1990 | Grynaeus et al. ....... 428/113 |
| 5,080,951 | 1/1992 | Guthrie .................... 428/85 |
| 5,096,722 | 3/1992 | Bair ......................... 426/107 |
| 5,118,550 | 6/1992 | Baravian et al. ........ 428/90 |
| 5,134,017 | 7/1992 | Baldwin et al. ......... 428/198 |
| 5,141,794 | 8/1992 | Arroyo .................... 428/138 |
| 5,149,576 | 9/1992 | Potts et al. .............. 428/198 |
| 5,151,320 | 9/1992 | Homonoff et al. ...... 428/284 |
| 5,188,885 | 2/1993 | Timmons et al. ....... 428/198 |
| 5,192,601 | 3/1993 | Neisler .................... 428/120 |
| 5,200,246 | 4/1993 | Sabee ...................... 428/109 |
| 5,219,633 | 6/1993 | Sabee ...................... 428/109 |

*Primary Examiner*—James J. Bell
*Attorney, Agent, or Firm*—Weingarten, Schurgin, Gagnebin & Hayes LLP

[57] ABSTRACT

The invention features a nonwoven composite material which includes a layer of staple fiber aligned surface-to-surface with a spunbonded continuous filament web layer, the layers being continuously thermally bonded.

20 Claims, 2 Drawing Sheets

NONWOVEN COMPOSITE MATERIAL AND METHOD FOR MAKING SAME

This application is a continuation of application Ser. No. 08/115,377, filed Sep. 1, 1993 now abandoned.

Nonwoven sheets made of synthetic fibers have been used as substrates in a variety of applications, e.g., carpets, tiles wall coverings, coatings, etc. Nonwoven fabric laminates such as spun-bonded/melt-blown/spun-bonded (SMS) laminates are useful, e.g., for towels, industrial garments, medical garments and drapes, sterile wraps, diapers, etc. Nonwoven sheets may be manufactured by dry route, wet route, or by extrusion of a molten mass in the form of filaments (i.e., a spun-bonded sheet).

Generally, these articles require high dimensional stability and the ability to withstand, especially during manufacture, simultaneous mechanical and thermal stresses. Such stresses result in risks of distortion during aging of the laid article, e.g., lengthwise elongation, transverse shrinkage, and inverse distortions, due to "elastic recovery".

U.S. Pat. No. 5,118,550 describes a substrate based on a nonwoven sheet made of continuous fibers and reinforced by glass threads which are chemical or heat bonded to the textile.

U.S. Pat. No. 5,188,885 describes a nonwoven fabric laminate formed of two external spun-bonded layers and an internal melt-blown layer using olefin-like polymers having a crystallinity of less than 45%.

U.S. Pat. No. 5,134,017 describes foam-coated spun-bonded and spunbonded/pointbonded nonwovens.

U.S. Pat. No. 4,906,507 relates to production of a composite adhesive web including a fibrous adhesive nonwoven sheet of thermoplastic fibers and randomly arranged thermoplastic filaments or parallel thermoplastic filaments interconnected by randomly arranged thermoplastic fibers.

U.S. Pat. No. 5,096,722 relates to a packaging for microwave cooking which includes a grease-absorbing pad of porous spunbonded polyester outer fabric heat-bonded at the edges to a needle-punched nonwoven polyester staple-fiber core layer.

A spun-bonded web layer may be made from continuous, randomly deposited filaments of synthetic polymers. Such webs do not in themselves possess textile-like or drapability qualities, but are thin, paper-like layers with an open, uneven fleece appearance. These webs possess good tensile and tear strength and have dimensional stability.

In contrast, a firmly bonded drylaid nonwoven, i.e., made from short staple fibers, has poor dimensional stability and poor tensile and tear strength. However, such nonwoven product can provide drapability and textile quality.

It is an object of the invention to provide a fabric-like composite material having isotropic tensile and tear strength. Another object is to provide a tear-resistant fabric-like material which maintains drapability and textile-like surface properties.

SUMMARY OF THE INVENTION

The invention is based on the discovery that composite fabric-like materials having isotropic tensile and tear strength as well as textile-like surface and drapability characteristics may be produced by bonding two nonwoven layers, a layer of staple fiber batt with a layer of spun-bonded web of continuous filaments, over their surface area.

Thus, the invention features a nonwoven composite material which includes a layer of staple fiber and a spunbonded web layer comprising continuous filaments, thermoplastic fibers forming at least a portion of one of the layers, the layers being thermally bonded over at least a portion of their confronting surface area.

Preferably, the staple fiber layer and the spunbonded web layer are opposed surface-to-surface and point-bonded continuously over the entire surface area; or the opposed layers are intermittently bonded over 5–40% of the surface area of the composite material. As used herein, "continuously" thermally bonded and bonding over a portion of confronting surface layers' refers to heat bonding of layers both along the width and length of the surface area of the material comprising the layers (as opposed to bonding only at the edges of the layers), and substantially evenly over that area; "point"-bonded refers to bonding of the layers at discrete points; "intermittently" bonded refers to a bonding pattern in which the layers are bonded within discrete areas over the entire surface area of the material. Continuous or intermittent bonding, according to the invention, thus will occur across the width and along the length of the material, rather than simply at the edges, and confer integrity to the composite material along its length and width.

Preferably, the composite material may include a staple fiber layer sandwiched between layers of spun-bonded web, or a spunbonded web layer sandwiched between layers of staple fiber. The layer of staple fiber may include 15% thermoplastic (or pseudothermoplastic-defined as a plastic which becomes tacky but does not deform by melting at elevated temperatures) fiber; the spunbonded web layer includes a first filament of a thermoplastic polymer having a first melt point; the spunbonded web layer further includes a second filament of a thermoplastic polymer having a second melt point, the first and second sticking points being different, and the polymer having the lower melt point facilitates bonding of the layers upon heat-bonding.

The term "fiber", as used herein, is taken to means a unit of matter characterized by having a length of at least two orders of magnitudes greater than its diameter or width and which can be formed into a fabric web. "Powder" refers to a non-fibrous substance in the form of fine discrete particles which cannot be formed into a fabric web. Typically, the length, width, and thickness dimensions of the particles are within two orders of magnitude or less of each other.

The invention also features a nonwoven composite material which includes a layer of staple fiber closely opposed to a layer of spunbonded web comprising continuous filaments, wherein the composite material has continuous, i.e., along its length and width, high degree of isotropic tensile and tear strength and drapability.

As used herein, isotropic tensile and tear strength is defined as the ability to withstand forces and tears evenly in any direction along the length or width of the material; and "drapability" is defined as the property of easy and natural folding without stiffness, e.g., as with articles of clothing or window dressings; a composite material is "drapable" if it folds upon folding.

The invention also features methods of making a nonwoven composite material, one method of which includes the steps of: (a) positioning a layer of staple fiber and a layer of spunbonded continuous filament web in surface-to-surface alignment; and (b) bonding the layers together by applying heat and pressure substantially evenly or at selected points over the entire surface area. "Substantially evenly" refers to the application of heat and pressure across the width and along the length of the aligned layers.

Another method of making a nonwoven composite material includes the steps of: (a) positioning a layer of staple fiber and a layer of spunbonded continuous filament web in a surface-to-surface alignment, wherein the layer of spunbonded web includes a filament of a thermoplastic polymer having a melt point which facilitates bonding of the layers; and (b) bonding the layers by applying heat continuously over the surface area of one layer together with pressure, wherein the heat is high enough to induce softening of the thermoplastic polymer.

Yet another method of the invention includes the steps of: (a) positioning a layer of staple fiber and a layer of spunbonded continuous filament web in a surface-to-surface alignment, wherein the layer of spunbonded web includes a first filament comprising a thermoplastic polymer having a first melt point and a second filament including a thermoplastic polymer having a second melt point, wherein the first and second sticking points are different and the polymer having the lower melt point facilitates bonding of the layers; and (b) bonding the layers together by applying heat across the surface area of one layer together with pressure, wherein the heat is high enough to induce softening of at least one of the thermoplastic polymers.

Preferably, methods of the invention include applying pressure at intermittent points on the positioned layers; applying pressure intermittently over 5–40% of the surface area of the composite material; applying pressure by passing the layers between two calender rolls, wherein one roll is embossed and the embossed roll intermittently embosses 5–40% of the surface area of the composite material.

"Nonwoven spunbonded web" refers to a web of material which has been formed without the use of a weaving process and which has a construction of individual fibers, filaments or threads which are substantially continuous and randomly disposed. "Substantially continuous" fibers means that a majority of polymeric filaments of a web are unbroken or uncut fibers. "Staple" fibers are noncontinuous, i.e., cut filament fibers. A "staple fiber batt" or "layer" refers to a batt or layer of staple fibers of uniform weight held together by fiber to fiber cohesion and having limited dimensional stability. The "sticking" temperature of a thermoplastic polymer fiber or filament is that temperature at which the fiber or filament sticks to another fiber or filament upon heating. "Bonding" of a fiber or filament refers to the attachment of a polymer fiber or filament upon reaching its melt point to another fiber.

Nonwoven composite materials of the invention are useful in manufactured goods such as window shades, e.g., vertical window blinds or pleated window shades, linings of articles of clothing, industrial garments, medical garments and drapes, sterile wraps, towels, liquid and air filtration media, or any material in which both a predetermined porosity and dimensional stability are required.

DESCRIPTION OF EMBODIMENTS OF THE INVENTION

Before describing embodiments of the invention, the drawings will be described briefly.

DRAWINGS

DETAILED DESCRIPTION

Figure 1:
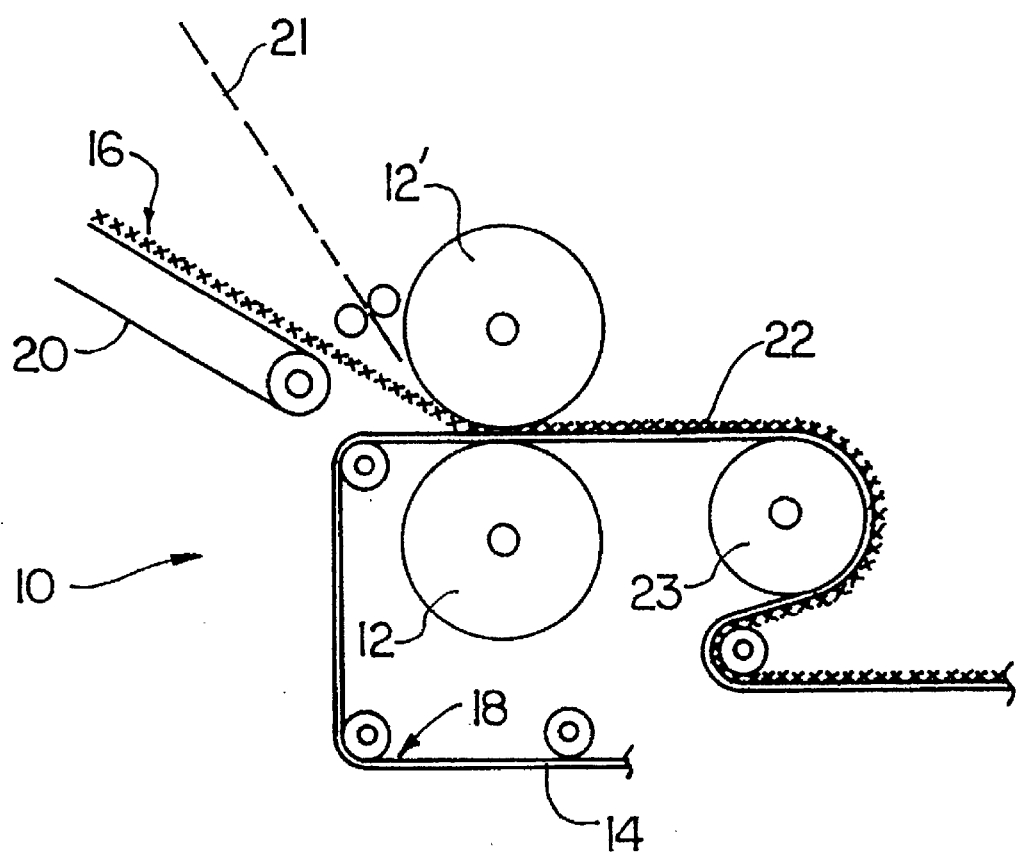
FIG. 1 is a schematic drawing of an apparatus for producing the nonwoven composite material of the invention.

The invention relates to the manufacture of nonwoven materials that exhibit high isotropic tensile and tear strength, i.e., dimensional stability, as well as drapability and a textile-like appearance. Materials of the invention are composites of one or more layers of spunbonded web made from continuous and randomly deposited fibers of thermoplastic polymers and one or more layers of carded polymeric staple fibers. Spunbonded fabrics and fabrics using staple fibers are discussed in "Encyclopedia of Textiles, Fibers and Nonwoven Fabrics", Ed. M. Grayson, John Wiley and Sons, NY, 1984, pages 252–304, hereby incorporated by reference.

Thermoplastic Polymers Useful in the Invention

As used herein, "thermoplastic polymer" refers to polymers which are capable of melting when subject to heat while psuedo-thermoplastics differ by becoming only tacky, not melting. A variety of different thermoplastic (intended to include psuedo-thermoplastic as used here) can be employed in both the spunbonded web layer and the staple fiber layer of the composite material of the invention. These polymers will form filaments which may be used in combination with other filaments which have different melt points, particularly in the spunbonded web layer. Thus, in some embodiments of the invention, the thermoplastic fibers of the layers are composed solely of one type of thermoplastic, whereas in other embodiments, they are composed of mixtures of two or more types of thermoplastic polymers. See, for example, the webs described in U.S. Pat. No. 4,906,507, hereby incorporated by reference. In the spunbonded web, these polymers will form continuous filaments, whereas in the staple fiber layer, noncontinuous fibers are used. Thermoplastic polymers of the invention include but are not limited to co-, ter-, or higher polyesters, e.g., terpolymer of nylon 6, 66, and 12, polypropylene, polyethylene, polybutane, polymethyldentene, ethylenepropylene copolymers, polyamides such as polyhexamethylene adipamide, poly-(occaproamide), polyhexamethylene sebacamide, polyvinyls such as polystyrene, thermoplastic elastomers such as polyurethanes, or thermoplastic polymers such as polytrifluorochloroethylene or mixtures thereof, as well as mixtures of these thermoplastic polymers and co-polymers, ethylene vinyl acetate polymers, synthetic polymers comprising 40% or more of polyurethane, polyetheresteres, polyetherurethane, polyamide elastomeric materials, and polyester elastomer materials, polyester and polyurethane elastomeric materials. For example, polyethylene terephthalate alone or in combination with polybutylene terephthalate may be used as a polyester-based filament, the polymers being spun together in the form of a twin component or spun separately and arranged side-by-side or coaxially.

Any of the fiber-forming thermoplastic polymers including fiber forming hot melt adhesives, and viscoelastic hot melt adhesives can be used in the spunbonded web as the bonding agent. The invention is not limited to the above polymers, for any polymer, co-polymer or mixture (with the same or different melting or softening points) capable of forming a heat-sensitive plastic filament or fiber is suitable in the invention. The sticking points of a fiber made from any of the above polymers will be known to those of skill in the art and, if not known, may be readily determined according to conventional means.

Thermoplastic fibers useful in the invention shall have a melting point, or sticking point of at least about 120° C. The upper limits and preferred ranges will depend on practical consideration of the intended uses and processes of manufacture. The invention is not limited to the use of any particular fiber, but takes advantage of many properties of different fibers. For example, the spunbonded web layer is composed of one, two or more of these thermoplastic polymers and comprises not only a thermoplastic or pseudothermoplastic component, but also includes other type of fibers, e.g., natural or manmade fibers, including textile threads or yarns composed of cotton, rayon, hemp, etc., in any amount which preserve the sheet and bonding requirements for the invention.

The spunbonded web layer is also made of one, two or more of these thermoplastic polymers. The melt point or sticking point of the thermoplastic polymers from which the spunbonded web is made is at least about 120 degrees centigrade, and follows similar practical consideration of the other layers. Spunbonded layers are preferably made from two different thermoplastic fibers, the two fibers including polymers having different melt points. Where the spunbonded layer comprises different melt point polymers, the fiber polymer having the lower melt point will act as the bonding agent upon heat bonding of not only the spunbonded web structure, but also of the composite structure.

Forming spunbonded material is conventional in the art. Any method for forming a nonwoven web having continuous fibers of a polymer is encompassed for use in the invention. For example, the spunbonded web may be made by extrusion of a molten mass in the form of filaments. Thus, the nonwoven spunbonded web 14 is prepared in conventional fashion as described, e.g., in Dorschner et al., U.S. Pat. No. 3,692,618, Kinney, U.S. Pat. 3,338,992 and 3,3411, 394, Levy, U.S. Pat. No. 3,502,538, Hartmann, U.S. Pat. No. 3,502,763 and 3,909,009, Dobo et al., U.S. Pat. No. 3,542, 615, and Appel et al., U.S. Pat. No. 4,340,563, the disclosures of which are hereby incorporated by reference.

Nonwoven spunbonded webs made from continuous fibers will generally be made from a polymer which is continuously extruded through a spinnerette in discrete fibers. The fibers may be drawn mechanically or pneumatically without breaking in order to orient the polymer fibers. The continuous fibers may then be deposited in a substantially random manner onto a carrier belt to form a web. The continuous fiber layer generally has a thickness in the range of 0.01–1 mm. A nonwoven fleece-like web is characterized by an extreme entanglement of the fibers, which provides coherency and strength to a web and also confers on the web increased dimensional strength. The aspect ratio (ratio of length to diameter) of the fibers of the web approaches infinity, i.e., the fibers are essentially continuous. The fibers are long and entangled sufficiently that it is generally impossible to remove one complete fiber from the mass of fibers or to trace one fiber from beginning to end.

The polymeric staple fiber layer or layers, which provide softness, absorbency, and drapability, can be made from a variety of fibers. The fiber composition of the staple fiber layer will contain at least 15%, preferably 20%, 25%, or 30%, up to 100% thermoplastic or pseudo-thermoplastic fibers. The preferred fiber blend for the layer or layers of staple fiber will act as a bonding agent for the staple fiber layer and also contribute to the bonding to the adjacent fiber layers. The layer of staple fiber is formed by any conventional method, including airlaying, carding, garnetting, or similar batt-forming techniques. The fiber length of the staple fiber can range from about 1.0 to 4.5 inches and the denier shall be between about 0.7 and 50, preferable, however, between 1 and 6 denier. The staple fiber layer may be in the weight range of 10–80 gm/m$^2$. For use in the present invention, there is no pre-bonding of the staple fiber layer.

Thermal bonding

The bonding method for bonding the composite material is preferably thermal-bonding. The bonding is preferable done with calender rolls, one or both of which is heated and one or both of which is embossed, which allows discrete point or area bonding across the surface area of at least one of the layers to thereby bond two layers together. That is, if one calender roll is heated and embossed, the aligned spunbonded continuous-filament layer and staple fiber layer are passed between two calender rolls and the layer closest to the heated and embossed calender roll will become bonded to the remaining layer(s). Preferably, both rollers are heated. While nonwoven materials of the invention are not limited to a particular bonding pattern, the ability of the polymer fibers to bond at the discrete bonding points or areas is significant to formation of a composite structure having high tensile and tear strength. Bonding according to the invention will occur both across the width and along the length of the composite material, and thus will strengthen the composite material over all of its surface area. Point or area bonding serves to hold the layers of the composite together across their surfaces as well as to provide integrity to each individual layer by bonding fibers within each layer. Thermal bonding for thermoplastic polymers is achieved by heating the rollers sufficiently in conjunction with pressure to bond with melting. The corresponding temperature to which the calender roll must be heated in order to achieve the desired temperature is approximately the same, or slightly above, the desired softening point temperature. Pressure is exerted on the layers as they are passed between the two calender rolls, typically to cause the layers to bond and is a function of the area bonded between rollers.

A typical embossing or bonding pattern may have round or square pin bonding points wherein each embossing pin has a side dimension of, e.g., 0.010–0.050 inch, a spacing between pins of, e.g., 0.010–0.100 inch, and a depth of bonding of, e.g., 0.015–0.070 inch. The resulting pattern may have a bonded area of, e.g., between 10 and 40%. Other typical bonding patterns may include the following dimensions.

TABLE 1

| Square pin bonding points dimensions | | Bonded area |
| --- | --- | --- |
| side dimension | 0.038 inch | |
| spacing between pins | 0.070 inch | |
| depth of bonding | 0.023 inch | 29.5% |
| side dimension | 0.023 inch | |
| spacing between pins | 0.062 inch | |
| depth of bonding | 0.033 inch | 15% |
| side dimension | 0.037 inch | |

TABLE 1-continued

| Square pin bonding points dimensions | | Bonded area |
|---|---|---|
| spacing between pins | 0.097 inch | |
| depth of bonding | 0.039 inch | 15% |

FIG. 1 shows a diagram of an apparatus for producing the nonwoven composite material of the invention. The apparatus 10 includes two calender rolls 12, 12' between which the spunbonded web layer 14 and the staple fiber batt 16 are positioned surface to surface and fed from accompanying sources 18 and 20, respectively. The layer 18 is typically pulled through by means 23 and layer 16 is placed on conveyer 20. One or both of the calender rolls 12, 12' may be heated and/or embossed. Preferably, one roll is both heated and embossed, whereas the second roll is also typically heated and includes a flat surface. The heated roll or rolls is maintained at a temperature which allows at least one of the thermoplastic polymers to soften. As the spunbonded web layer 14 and staple fiber batt 16 are aligned surface to surface and fed between rollers 12, 12', the rollers are in contact with each other so as to exert pressure on the web layer 14 and staple fiber layer 16 as they pass between. The combination of exerted pressure and heat softens at least the lowest melting thermoplastic fiber, which softened fiber in turn acts as a bonding agent for the web or staple fiber layer in which it is contained and between adjacent layers for the composite material. After passing between the calender rolls, the composite material may then be passed over a cooling surface, e.g., between two cooling rolls 23. The spunbonded web or webs and the layer or layers of the staple fiber web are bonded together by positioning them in a surface-to-surface alignment and softening one or more components within the structure with a combination of heat and pressure. The heat and pressure may be applied over the total surface area of the composite material. Preferably, the heat and pressure are applied in a well-defined intermittent point pattern which exposes between five and forty or fifty percent of the surface area of the composite structure.

The heat and pressure applied to the composite structure must be high enough to induce softening of at least one of the thermoplastic polymer components. Heat and pressure bonding of the continuous, randomly deposited fibers of thermoplastic polymer into the composite structure confers isotropic tensile and tear strength. The resultant composite material may be subjected to high stress and strain.

Figure 2:
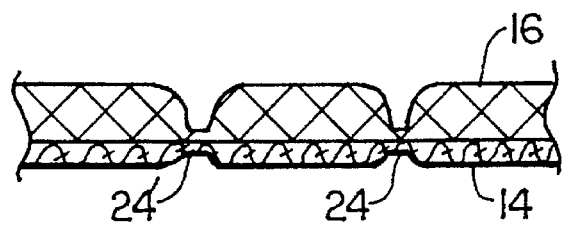
FIG. 2 is a schematic drawing of a composite material having a staple fiber layer and a spun-bonded nonwoven web layer.
Figure 3:
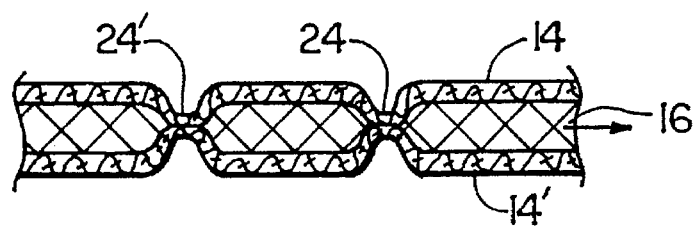
FIG. 3 is a schematic drawing of a composite material having a staple fiber layer sandwiched between two spunbonded nonwoven web layers.
Figure 4:
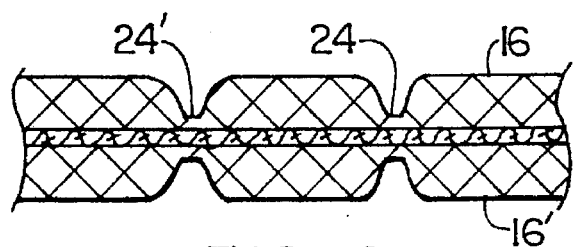
FIG. 4 is a schematic drawing of a composite material having a spun-bonded nonwoven web layer sandwiched between two staple fiber layers.

FIGS. 2–4 illustrate preferred composite materials of the invention. For example, in FIG. 2 the composite material comprises a single layer of staple fiber 16 and a single layer of spunbonded web 14. The layers are surface to surface and point-bonded in discrete areas 24, 24' of the material. In FIG. 3, the composite material includes a staple fiber layer 16 sandwiched between two spunbonded web layers 14, 14'. This material is also point-bonded in discrete areas 24, 24'. In FIG. 4, the composite material includes a layer of spunbonded web 14 sandwiched between two layers of staple fiber 16, 16' and point-bonded in discrete areas 24, 24'. The apparatus of FIG. 1 is modified by the addition of an extra feed 21 to provide the three layer structures of FIG. 3 and 4, alternatively, the layers may be built up from pass to pass.

Figure 5:
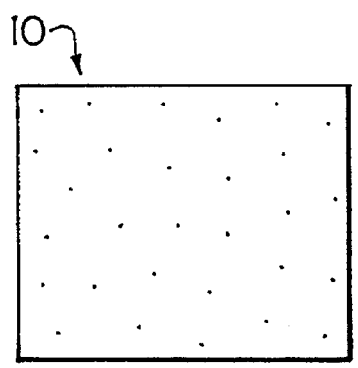
FIG. 5 is a schematic drawing of the external surface of one side of a composite material of the invention, in which the material is point-bonded continuously over approximately 10% of its surface area.
Figure 6:
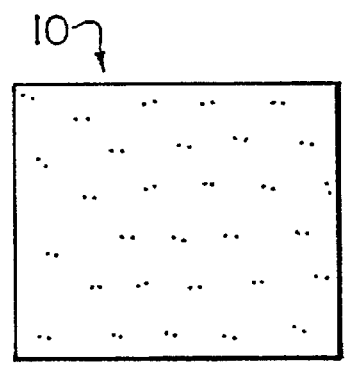
FIG. 6 is a schematic drawing of the external surface of one side of a composite material of the invention, in which the material is bonded intermittently over approximately 20% of its surface area.

FIG. 5 is a schematic drawing of the external surface of one side of a composite material of the invention, in which the material is point-bonded continuously over approximately 10% of its surface area. FIG. 6 is a schematic drawing of the external surface of one side of a composite material of the invention, in which the material is bonded intermittently over approximately 20% of its surface area.

EXAMPLES

The following examples serve to illustrate, but do not limit the invention.

Example 1

A drylaid, carded nonwoven batt of 100%, 3 denier by 1.5 inch polyester staple fiber is bonded to a layer of continuous thermoplastic filament web by passing both layers through a set of heated calender rolls. The weight of these layers is 20 grams per meter squared (g/sq.m.) and 50 g/sq.m. respectively. One of the calender rolls is embossed with an embossing area of approximately 10% whereas the other calender roll has a smooth surface. The two fiber layers are passed through the calender at a speed of 6 meters/min. The surface temperature of the calender rolls is 215 degrees C. and the nip pressure is 36 Newton/mm.

Example 2

A drylaid carded nonwoven batt compromised of 50% 1.5 denier by 1.5 inch drawn polyester fiber and 50% of undrawn (amorphous) 8 denier by 1.5 inch polyester fiber is bonded to a layer of continuous thermoplastic filament web by passing both layers through a set of calender rolls, as described in Example 1. The two layers were combined at a calender speed of 6 meters/min, a calender nip pressure of 36 Newton/mm and a roll surface temperature of 152 degrees C.

Example 3

A drylaid carded nonwoven batt of 100% of 5 denier by 38 mm polyacrylonitrile/polyacrylate fiber (Lanseal F fiber from Toyobo) was positioned between two layers of continuous thermoplastic filament webs. The weight of the carded batt was 65 g/sq.m. and the continuous fiber filament layers weigh 20 g/sq.m. each. The layers were thermally bonded at 145 degrees C. under 36 Newton/mm pressure. The bonding area of the embossed roll is 25%.

Example 4

Two layers of drylaid carded nonwoven batt compromised of seventy-five percent (75%) of 1.5 denier by 1.5 inch drawn polyester fiber and twenty-five percent (25%) of 8 denier by 1.5 inch undrawn (amorphous) polyester fiber were positioned on both sides of a layer of continuous thermoplastic filament web. This multilayered construction was thermally bonded by passing it through a set of heated calender rolls at 6 meters/min, at a pressure of 36 Newton/mm and a bonding temperature of 160 degrees C. The bonding area of the embossed roll is approximately 10%.

While the invention is described in connection with preferred embodiments, it will be understood to those of skill in the art that the invention is not limited to those embodiments, but is intended to cover all alternatives, modifications, and equivalents which are included within the spirit and scope of the invention, as defined above and in the appended drawings and claims.

We claim:

1. A nonwoven composite material, comprising
   at least one layer of a noncontinuous thermoplastic staple fiber;
   at least one spunbonded web layer comprising continuous thermoplastic filaments;

wherein said continuous thermoplastic filaments of said at least one spun bonded web layer comprise a first thermoplastic fiber having a first melting point, and a second thermoplastic fiber having a second melting point, said first melting point lower than said second melting point;

bonds between said layers formed as thermal bonds with said thermoplastic fibers over at least a portion of confronting surfaces between said layers, said thermal bonds being point-bonded.

2. The nonwoven composite material of claim 1 wherein said layer of staple fiber comprises at least 15% thermoplastic fiber.

3. The nonwoven composite material of claim 1 wherein said point bonds cover 5–40% of the surface area of the composite material.

4. The nonwoven composite material of claim 1 wherein said thermal bonds are intermittent over 5–40% of the surface area of the composite material.

5. The nonwoven composite material of claim 1 wherein said staple fiber layers is provided between first and second said layers of spun-bonded web.

6. The nonwoven composite material of claim 1 wherein said spunbonded web layer is provided between first and second said layers of staple fiber.

7. A nonwoven composite material, comprising a layer of noncontinuous, thermoplastic staple fiber closely opposed to a layer of spunbonded web comprising continuous thermoplastic filaments;

wherein said continuous thermoplastic filaments of said at least one spun bonded web layer comprise a first thermoplastic fiber having a first melting point, and a second thermoplastic fiber having a second melting point, said first melting point lower than said second melting point;

thermal bonds between said layers formed from heat softened portions of said thermoplastic fibers, said thermal bonds being point bonds; and said composite material having on the one hand isotropic tensile and tear strength and dimensional stability, and on the other drapability contributed separately by said layers.

8. The composite material of claim 7 wherein at least three said layers are provided of alternating staple fiber and spunbonded web.

9. The composite material of claim 7 wherein said thermal bonds are continuous.

10. A method of making a nonwoven composite material, said method comprising the steps of:

(a) providing a layer of noncontinuous thermoplastic staple fiber and a layer of spunbonded web, said layer of spunbonded web comprising continuous thermoplastic filaments, said thermoplastic filaments comprising a first thermoplastic fiber having a first melting point, and a second thermoplastic fiber having a second melting point, said first melting point lower than said second melting point;

(b) positioning said layers in surface-to-surface alignment, and;

(c) bonding said layers together in at least selected regions by applying heat and pressure continuously across the surface of said aligned layers.

11. A method of making a nonwoven composite material, said method comprising the steps of:

(a) positioning a layer of noncontinuous thermoplastic staple fiber and a layer of spunbonded web in a surface-to-surface alignment, wherein said layer of spunbonded web comprises continuous thermoplastic filaments, said continuous thermoplastic filaments comprising a first thermoplastic fiber having a first melting point, and a second thermoplastic fiber having a second melting point, said first melting point lower than said second melting point; and (b) bonding said layers together by applying heat and pressure at least selected points across the layers, wherein said heat is high enough to induce softening of said first thermoplastic fiber of said spunbonded web layer.

12. A method of making a nonwoven composite material, said method comprising the steps of:

(a) positioning a layer of noncontinuous thermoplastic staple fiber and a layer of spunbonded web in a surface-to-surface alignment, wherein said spunbonded web layer comprises continuous thermoplastic filaments, said continuous thermoplastic filaments comprising a first filament comprising a thermoplastic polymer having a first softening point, and;

a second filament comprising a thermoplastic polymer having a second softening point, wherein said first and second softening points are different and the polymer having the lower softening point facilitates bonding of said layers; and (b) bonding said layers together by applying heat and pressure at least selected points across the layers, wherein said heat is high enough to induce softening of at least one of said thermoplastic polymers.

13. The method of claim 10, 11, or 12 wherein said pressure is applied at intermittent points on said positioned layers.

14. The method of claim 13 wherein said pressure is applied to 5–40% of the surface area of said composite material.

15. The method of claim 14 further including the step of applying said pressure by passing said aligned layers between two calender rolls.

16. The method of claim 15, further including the step of selectively applying pressure between layers via calender rolls with embossing.

17. The method of claim 15, including the step of applying bonding pressure between said calender rolls, over 5–40% of a surface area of said composite material.

18. The method of claim 10, 11 or 12 further including the step wherein said staple fiber layer is provided as a batt with at least 15% of thermoplastic fiber.

19. The method of claim 18 wherein the step of providing said staple fiber layer includes the step of batt formation by airlaying or drylaying.

20. The method of claims 10, 11 or 12 further including the step of providing said spun bonded web with filaments of different types of thermoplastic polymers.

* * * * *